United States Patent
Zangi et al.

(10) Patent No.: US 7,274,936 B2
(45) Date of Patent: Sep. 25, 2007

(54) METHOD AND APPARATUS FOR MEASURING CHANNEL QUALITY USING A SMART ANTENNA IN A WIRELESS TRANSMIT/RECEIVE UNIT

(75) Inventors: Kambiz Casey Zangi, Chapel Hill, NC (US); Janet Stern-Berkowitz, Little Neck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 118 days.

(21) Appl. No.: 11/026,296

(22) Filed: Dec. 30, 2004

(65) Prior Publication Data

US 2005/0181733 A1 Aug. 18, 2005

Related U.S. Application Data

(60) Provisional application No. 60/543,012, filed on Feb. 6, 2004.

(51) Int. Cl.
  *H04Q 7/20* (2006.01)
(52) U.S. Cl. .................. 455/442; 455/63.4; 455/101; 455/443; 455/525; 455/575.7; 370/331; 370/332; 342/81; 342/367; 342/368; 343/757; 343/824
(58) Field of Classification Search .............. 455/62, 455/63.4, 101, 269, 436, 442, 443, 450, 550.1, 455/562.1, 575.7, 277.1–278.1, 161.1, 161.3, 455/437, 525; 342/81, 154, 354, 367, 368; 343/757, 777, 824; 370/331, 332, 334, 491, 370/500
See application file for complete search history.

(56) References Cited

U.S. PATENT DOCUMENTS

| | | | |
|---|---|---|---|
| 5,303,240 A * | 4/1994 | Borras et al. ............... 370/347 |
| 5,617,102 A * | 4/1997 | Prater ......................... 342/374 |
| 5,893,033 A * | 4/1999 | Keskitalo et al. ........... 455/437 |
| 5,903,826 A * | 5/1999 | Nowak ..................... 455/277.1 |
| 6,055,428 A * | 4/2000 | Soliman ..................... 455/437 |
| 6,100,843 A * | 8/2000 | Proctor et al. .............. 342/368 |
| 6,229,486 B1 * | 5/2001 | Krile ................... 343/700 MS |
| 6,304,215 B1 * | 10/2001 | Proctor et al. .............. 342/372 |
| 6,337,984 B1 * | 1/2002 | Hong et al. ................. 455/439 |
| 6,400,317 B2 * | 6/2002 | Rouphael et al. .......... 342/367 |
| 6,404,386 B1 * | 6/2002 | Proctor et al. .............. 342/368 |
| 6,448,938 B1 * | 9/2002 | Chiang et al. .............. 343/850 |
| 6,456,257 B1 * | 9/2002 | Zamat ........................ 343/876 |
| 6,473,036 B2 * | 10/2002 | Proctor, Jr. ................. 342/372 |

(Continued)

*Primary Examiner*—William Trost
*Assistant Examiner*—James D. Ewart
(74) *Attorney, Agent, or Firm*—Volpe and Koenig, P.C.

(57) ABSTRACT

A method and apparatus for measuring a channel quality in wireless transmit/receive units (WTRUs) which are equipped with a subscriber based smart antenna. The WTRUs are equipped with a smart antenna so that the WTRU generates a plurality of directional beams and, optionally, an omni-directional beam. A dwell time is provided in a measurement period to switch a beam from an active beam to a non-active beam. The active beam is one of the plurality of directional beams or, optionally, the omni-directional beam, for communication with one or more serving base station(s). A beam is switched to a non-active beam at the initiation of the dwell time. Signals are received through the switched non-active beam, and samples of the received signals are generated. The samples are stored in a memory. Channel quality is measured using the samples, whereby the dwell time to measure the channel quality is minimized.

28 Claims, 3 Drawing Sheets

U.S. PATENT DOCUMENTS

| | | | |
|---|---|---|---|
| 6,515,635 B2* | 2/2003 | Chiang et al. | 343/834 |
| 6,594,243 B1* | 7/2003 | Huang et al. | 370/332 |
| 6,600,456 B2* | 7/2003 | Gothard et al. | 343/834 |
| 6,628,235 B2* | 9/2003 | Wight | 342/374 |
| 6,697,642 B1* | 2/2004 | Thomas | 455/562.1 |
| 6,771,622 B1* | 8/2004 | Banerjee | 370/331 |
| 7,065,373 B2* | 6/2006 | Rodgers et al. | 455/502 |
| 2001/0031648 A1* | 10/2001 | Proctor et al. | 455/562 |
| 2002/0071403 A1* | 6/2002 | Crowe et al. | 370/331 |
| 2002/0137538 A1* | 9/2002 | Chen et al. | 455/550 |
| 2003/0013408 A1* | 1/2003 | Blodgett et al. | 455/3.01 |
| 2003/0054772 A1* | 3/2003 | Majaniemi | 455/67.3 |
| 2003/0073463 A1* | 4/2003 | Shapira | 455/562 |
| 2003/0114172 A1* | 6/2003 | Soliman | 455/456 |
| 2003/0179138 A1* | 9/2003 | Chen | 342/372 |
| 2003/0222818 A1* | 12/2003 | Regnier et al. | 342/383 |
| 2003/0228857 A1* | 12/2003 | Maeki | 455/278.1 |
| 2004/0023634 A1 | 2/2004 | Jeong et al. | |
| 2004/0029534 A1* | 2/2004 | Odenwalder | 455/67.11 |
| 2004/0116110 A1* | 6/2004 | Amerga et al. | 455/422.1 |
| 2004/0127220 A1* | 7/2004 | Proctor | 455/442 |

* cited by examiner

METHOD AND APPARATUS FOR MEASURING CHANNEL QUALITY USING A SMART ANTENNA IN A WIRELESS TRANSMIT/RECEIVE UNIT

CROSS REFERENCE TO RELATED APPLICATION

This application claims the benefit of U.S. Provisional Application No. 60/543,012 filed Feb. 6, 2004, which is incorporated by reference as if fully set forth.

FIELD OF INVENTION

The present invention is related to wireless transmit/receive units (WTRUs). More particularly, the present invention is related to a method and apparatus for measuring channel quality in WTRUs which are equipped with a subscriber based smart antenna.

BACKGROUND

One of the important issues in wireless communication systems is capacity of the system. Smart antenna technology has been developed to increase wireless communication system capacity. Smart antennas are currently used in base stations, access points, and WTRUs. One form of smart antenna technology is the use of multiple radiating elements in one or more antennas to generate a plurality of directional beams. With this form of smart antenna, use of the directional beam or beams with the best quality reduces the amount of transmit power needed, usually resulting in increased system capacity.

In mobile communication systems, WTRUs typically monitor quality, such as signal-to-interference ratio (SIR), of the cell(s) currently serving the WTRU as well as neighboring cells. In WTRUs employing smart antenna techniques which generate a plurality of beams, the WTRUs would need to monitor the quality of the plurality of beams for all of these cells (or a subset of these cells).

Hereafter, the terminology "active beam" refers to a beam that a WTRU uses for its data transmission and reception, and the terminology "serving base station" refers to a base station currently communicating with the WTRU. The terminology "current beam" refers to the beam currently being formed by the element(s) of the antenna(s). In order to measure quality (such as SIR) on channels that correspond to non-active beams, the WTRU must switch its current beam to the non-active beam and observe the channel for some time. This time period is referred to as "dwell time", T_DWELL. Once the dwell time expires, the WTRU switches the current beam back to the original active beam for normal communication with the serving base station(s).

In the prior art, in order to measure the signal quality on inactive beams on multiple base stations, the WTRU switches its current beam to the inactive beams for each of those base stations for a period of time. For example, if a WTRU uses a smart antenna which is configured to generate three beams (a left beam, an omni-directional beam and a right beam), and if the right beam is an active beam and the WTRU has to measure SIRs to three base stations (BS-1, BS-2, and BS-3) using the left beam, the WTRU first switches the current beam from the right beam to the left beam for T_DWELL to measure the SIR to BS-1. During this time, for a CDMA system for example, the WTRU despreads the received signal using the known pilot (or other) signal transmitted from BS-1, and the despread values are used to estimate the SIR to BS-1. In order to measure the SIR to BS-2, the WTRU again switches the current beam to the left beam for another T_DWELL, and receives signals and despreads the received signal using the known pilot (or other) signal transmitted from BS-2. The despread values are then used to estimate the SIR to BS-2. Similarly, in order to measure the SIR to BS-3, the WTRU has to switch the current beam to the left beam again for another dwell time. Therefore, in this example, the WTRU must stay on the left beam for 3*T_DWELL to measure the SIRs on the left beam for all three base stations.

Data reception is degraded during the dwell time since the WTRU operates based on the assumption that the channel it sees corresponds to the active beam. In the foregoing example, data reception is interrupted for 3*T_DWELL. More generally, in accordance with the prior art, a WTRU must switch a beam for N*T_DWELL, to measure the SIR to N base stations on an inactive beam. Since data can be continuously transmitted to the WTRU, it is necessary to keep the dwell time as short as possible.

It is noted that the operations for despreading above (or other means for correlating the received signal with a known transmit signal) are done in real-time using the correlation resources in the mobile receiver (hardware blocks and/or software blocks in a microprocessor or DSP).

SUMMARY

The present invention is a method and apparatus for measuring a channel quality in WTRUs which are equipped with a subscriber based smart antenna. The WTRUs are equipped with a smart antenna so that the WTRU generates a plurality of directional beams, and, optionally, an omni-directional beam. A dwell time is provided in a measurement period to switch the current beam from an active beam to a non-active beam. The active beam is one of the plurality of directional beams or, optionally, the omni-directional beam, for communication with one or more serving base station(s). The current beam is switched to a non-active beam at the initiation of the dwell time. Signals are received through the non-active beam, and samples of the received signals are generated. The samples are stored in a memory. The current beam may be switched back to the active beam or another non-active beam. Channel quality is measured using the stored samples, whereby the dwell time to measure the channel quality is minimized.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, a wireless local area network (WLAN) client station, or any other type of device capable of operating in a wireless environment. When referred to hereafter, the terminology "base station" includes but is not limited to a Node B, a site controller, an access point, or any other type of interfacing device in a wireless environment.

Figure 1:
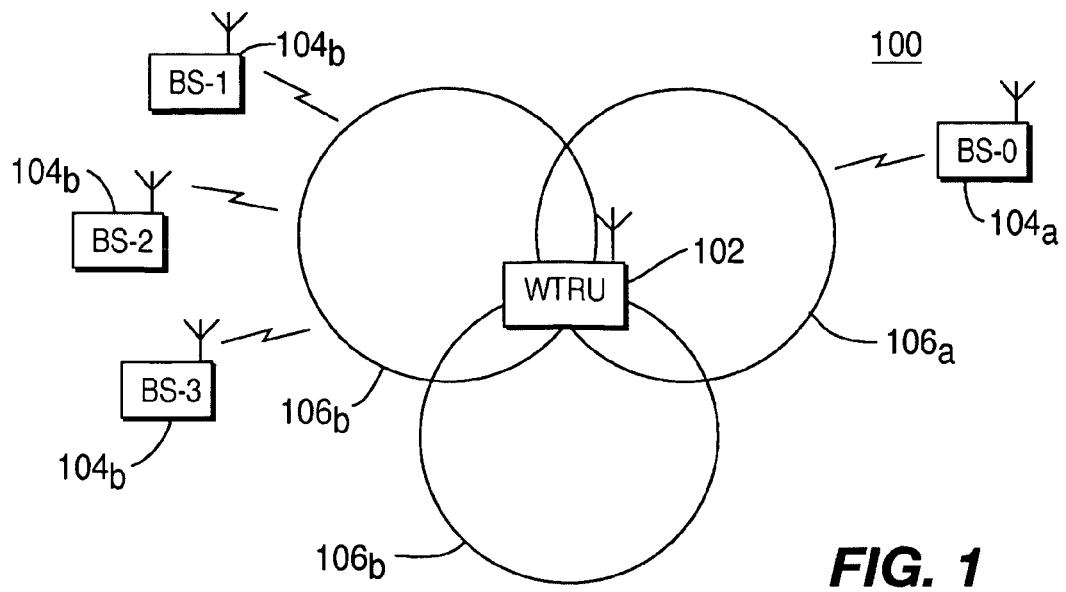
FIG. 1 is a diagram of a wireless communication system in accordance with the present invention.

FIG. 1 is a diagram of a wireless communication system 100 in accordance with the present invention. The wireless communication system 100 comprises a plurality of base stations 104a, 104b and WTRUs 102. A region in the wireless communication system 100 is divided into a plurality of cells and each cell is served by each base station 104a, 104b. A WTRU 102 is equipped with a smart antenna and generates a plurality of directional beams to communicate with a base station 104a, 104b. In FIG. 1, it is depicted that a WTRU generates three directional beams. However, it should be understood that the WTRU may generate any number of directional beams and may also generate and use an omni-directional beam.

The WTRU 102 receives signals from a serving base station (such as base station 104a) and from a plurality of non-serving base stations (such as base station 104b), and continually monitors channel quality to the base stations 104a, 104b. It should be noted that FIG. 1 illustrates only one serving base station as an example, not as a limitation and that there may be more than one serving base station, whereby the WTRU 102 may select or combine signals from the serving base stations (for example, perform soft combining of the signals from the active set base stations in a CDMA system). The channel quality is evaluated in terms of SIR or other relevant parameters.

In measuring channel quality to the base stations 104a, 104b with non-active beams, the WTRU 102 switches the current beam between an active beam 106a and non-active beams 106b. In FIG. 1, the WTRU is currently communicating with a serving base station BS-0 104a using an active beam 106a. The WTRU 102 periodically switches the current beam to non-active beams 106b and measures a channel quality to base stations BS-0, BS-1, BS-2 and BS-3, respectively. The WTRU does not have to use all non-active beams 106b, but may choose only a portion of the non-active beams 106b.

Figure 2:
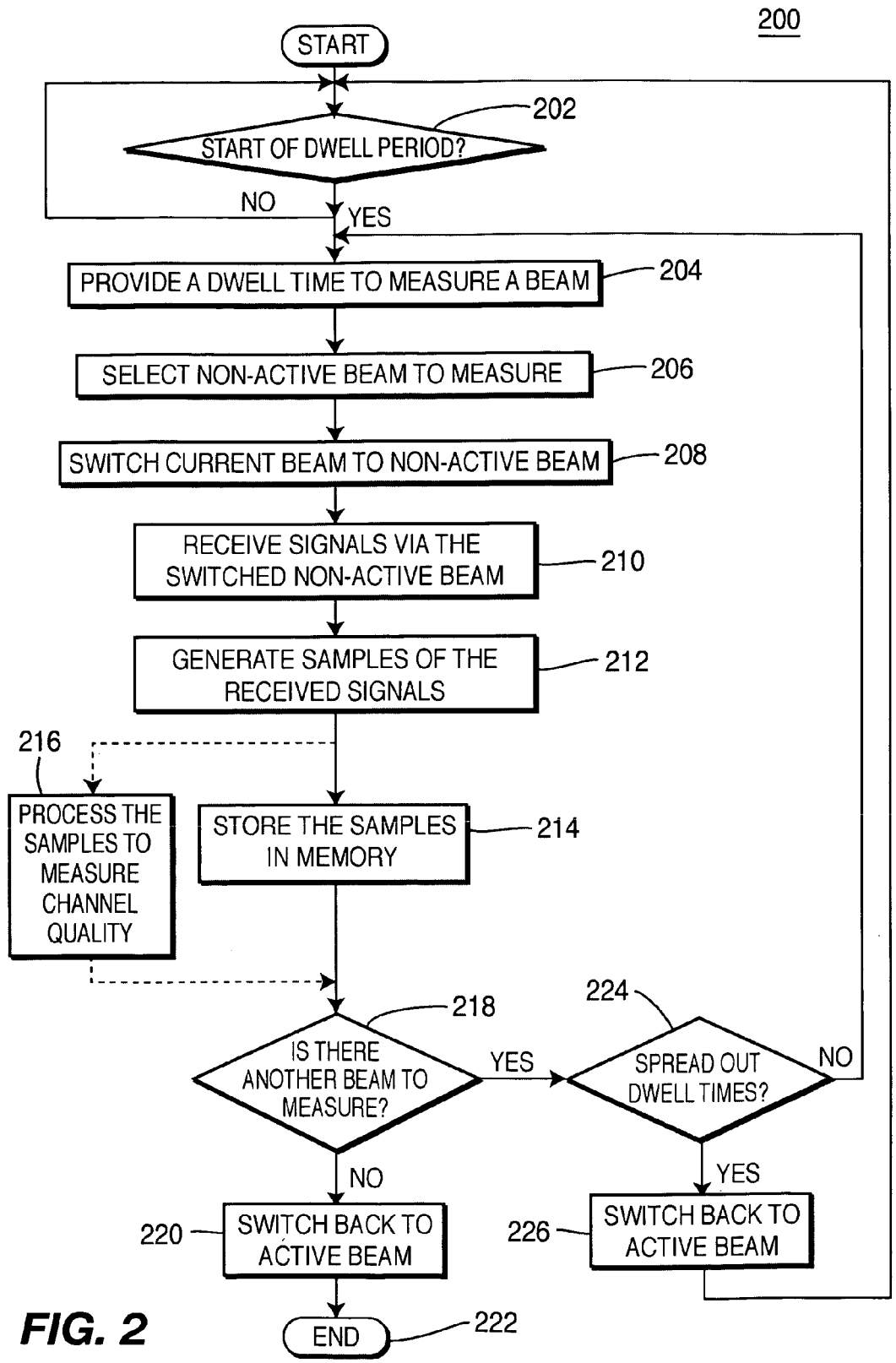
FIG. 2 is a flow diagram of a process for measuring a channel quality using a smart antenna in a WTRU in accordance with the present invention.

FIG. 2 is a flow diagram of a process 200 for measuring channel quality using a smart antenna in a WTRU 102 in accordance with the present invention. The process is typically initiated by a measurement triggering signal or event. After the process 200 is initiated, it is determined whether it is time to start a dwell period (step 202). The decision whether it is time to start a dwell period may be hardware and/or software controlled. One example is making the decision based on the expiration of a timer that is initiated at the start of the measurement period and expires after a pre-programmed wait period (which could be zero, a fixed value, or a variable value such as a fixed value with random jitter).

The measurement triggering signal is an external event that marks the beginning of a measurement period and starts the procedure 200. A measurement triggering signal may be any hardware or software event to indicate the start of a measurement period (for example: the change of voltage on a pin of an integrated circuit, the expiration of a timer, or a software process call to the process 200). The measurement triggering signal/event marks the beginning of a measurement period. The measurement triggering signal/event can occur periodically or not periodically, resulting in a measurement period that is fixed or variable. The simplest example is the periodic case; in this case a new measurement period is triggered immediately after a previous measurement period ends.

If it is not time to start a dwell period (step 202), then the process 200 waits at step 202 until it is time to start the dwell period. If it is time to start the dwell period, a dwell time is provided during the measurement period to measure a beam (step 204). Then, a non-active beam that has not yet been measured in the current measurement period is chosen for measurement (step 206) and the current beam is switched to that non-active beam (step 208).

Figure 4:
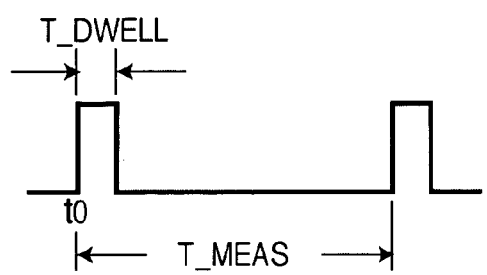
FIG. 4 shows a timing relationship between a dwell time and a measurement period in accordance with the present invention.

FIG. 4 shows a timing relationship between a dwell time and a measurement period in accordance with the present invention. More than one dwell time may be provided in one measurement period depending on processing capacity, which will be explained in detail hereinafter. The dwell time may start not only at the beginning of the measurement period, but may start from any place in the measurement period in accordance with the hardware and/or software that controls this decision (e.g., software parameters). The length of the dwell time is set to provide a sufficient time period for a WTRU 102 to collect enough samples to measure the channel quality of base stations with the desired accuracy. The place of the dwell time in a measurement period and the duration of the dwell time may be fixed or variable. Therefore, a different number, different duration, and different place of dwell time(s) may be provided in each measurement period.

After the current beam is switched to the non-active beam (step 208), the WTRU 102 receives signals from serving and non-serving base stations 104a, 104b through the switched non-active beam 106b (step 210). The WTRU 102 may select particular serving and non-serving base stations based on predetermined criteria, instead of processing all signals from serving and non-serving base stations 104a, 104b. The received signals are sampled (step 212) and the samples are stored in a memory (step 214). Once the samples are generated, the WTRU 102 computes the channel quality for the serving base station(s) 104a and non-serving base stations 104b (step 216). The WTRU 102 may start to compute the channel quality simultaneously while samples are generated and stored. Alternatively, the WTRU 102 may start to compute the channel quality after all the samples are generated and stored. The samples do not have to be processed before the current beam is switched to another beam, but may be processed in parallel with other procedures (for example, when new samples are generated with another beam) when the processing power of the WTRU 102 is sufficient for these multiple parallel processes.

After samples are generated and stored, it is determined if there is another non-active beam 106b to be measured (step 218). All non-active beams 106b do not have to be measured; the beams to be measured can be a select set of non-active beams. If there are no more non-active beams to be measured, the current beam is switched back to the original active beam 106a (step 220) and the process terminates (step 222) until the next measurement trigger.

If it is determined that there is another non-active beam 106b to be measured (step 218), a decision is made whether to spread out the dwell times (step 224). Spreading out the dwell times allows a gap between measurements on non-active beams. Whether a gap is desired could be a predetermined configuration decision or be based on external factors, such as signal quality. If a gap is desired, the process 200 switches back to the active beam (step 226) and then waits for the start of the next dwell period (step 202). If a gap is not desired (step 224), the process 200 gets the dwell time (step 204).

Figure 3:
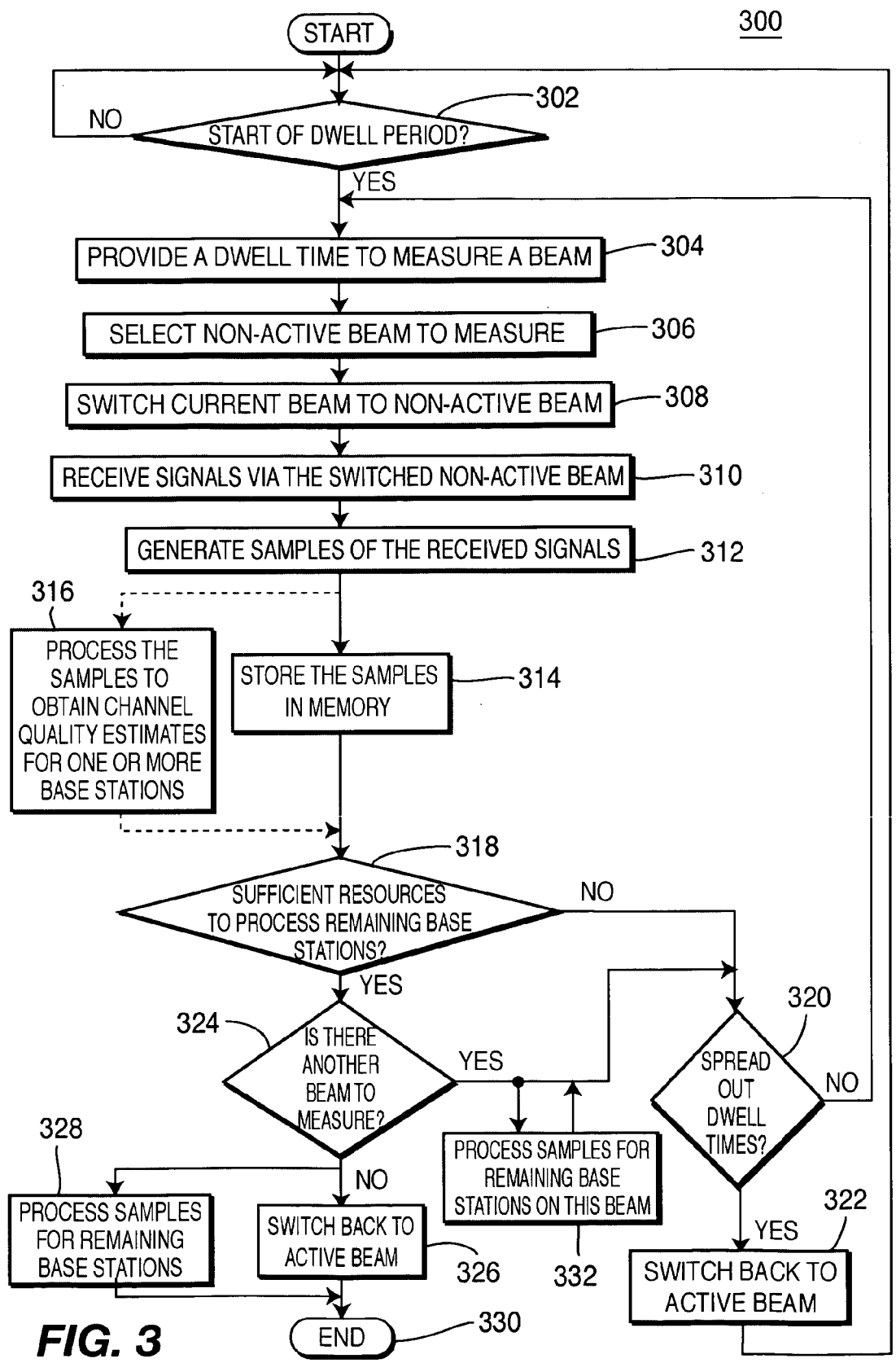
FIG. 3 is a flow diagram of a process for measuring a channel quality using a smart antenna in a WTRU in accordance with another embodiment of the present invention.

FIG. 3 is a flow diagram of a process 300 in accordance with another embodiment of the present invention. The process is typically initiated by a measurement triggering signal or event. After the process 300 is initiated, it is determined whether it is time to start a dwell period (step 302). The decision whether is it time to start a dwell period may be hardware and/or software controlled. If it is not time to start a dwell period, then the process 300 waits at step 302 until it is time to start the dwell period. If it is time to start the dwell period, a dwell time is provided during the measurement period to measure a beam (step 304). Then, a non-active beam is chosen for measurement (step 306) and the current beam is switched to that non-active beam (step 308). The non-active beam chosen is one that has not yet been measured in the current measurement period or one for which measurements have not been completed for all desired base stations in the current measurement period.

After the current beam is switched to the non-active beam (step 308), the WTRU 102 receives signals from serving and non-serving base stations 104a, 104b through the switched non-active beam 106b (step 310). The WTRU 102 may select particular serving and non-serving base stations based on predetermined criteria, instead of processing all signals from serving and non-serving base stations 104a, 104b. The received signals are sampled (step 312) and the samples are stored in a memory (step 314).

At the same time, the generated samples may be processed simultaneously to generate channel quality estimates for one or more base stations while samples are generated and stored (step 316). The number of base stations for which channel quality estimates can be computed while the samples are being stored is dependent on the processing power available.

It is then determined whether enough resources are available, without providing another dwell period in the current measurement period, to process the channel quality estimates for the current non-active beam for all the remaining base stations (for which these estimates are needed) that were not processed in step 316 (step 318). The determination is made based on the amount of resources available for estimating channel quality (for example, correlation resources in CDMA2000), which drives how much processing can be done in parallel, and the number of non-active beams and the number of base stations for which channel quality estimates are needed in the measurement period. The goal is to maximize parallelism so the current beam can return to, and remain on, the active beam as much as possible to minimize performance degradation.

If the resources are not sufficient, additional dwell time is needed and a decision is made whether to spread out the dwell times (step 320). Additional samples for the non-active beam may be collected during an added dwell time, which may be provided consecutively to the current dwell time or spread out during the same measurement period. Spreading out the dwell times allows a gap between measurements on non-active beams in which signals are received on the active beam. Whether a gap is desired could be a pre-determined configuration decision or be based on external factors, such as signal quality. If a gap is desired, the process 300 switches back to the active beam (step 322) and then waits for the start of the next dwell period (step 302). If a gap is not desired (step 320), the process 300 gets the dwell time (step 304).

As an alternative (not shown) to steps 320-322, the current beam is kept on the non-active beam and another dwell time is provided. During this added dwell time, the stored samples are processed to obtain the channel quality for additional base stations for the current non-active beam. After the dwell time, the process 300 returns to step 318 to again check if resources are sufficient for processing any remaining base stations without adding another dwell time.

If there are sufficient resources to process the remaining base stations (step 318), it is determined if there is another non-active beam 106b to be measured (step 324). All non-active beams 106b do not have to be measured; the beams to be measured can be a select set of non-active beams. If there are no more non-active beams to be measured, the current beam is switched back to the original active beam 106a (step 326), the samples for the remaining base stations are processed (step 328), and the process terminates (step 330) until the next measurement trigger.

If it is determined that there is another non-active beam 106b to be measured (step 324), then two steps occur in parallel. The first step is to continue to process the samples for the remaining base stations on the currently selected beam (step 332). Second, a decision is made whether to spread out the dwell times (step 320). If a gap is desired, the process 300 switches back to the active beam (step 322) and then waits for the start of the next dwell period (step 302). If a gap is not desired (step 320), the process 300 gets the dwell time (step 304).

In step 332, the samples do not have to be processed before the current beam is switched to another beam (active or inactive), but may be processed in parallel with other procedures (for example, when new samples are generated with another beam) when the processing power of the WTRU 102 is sufficient for these multiple parallel processes.

If a WTRU has processing capability to perform channel quality estimation to M base stations in a single dwell time, and there are a total of N base stations for which the WTRU has to measure channel quality, then to avoid adding additional dwell times for a given non-active beam, the WTRU has to perform channel quality estimation to K=N−M base stations while the beam is switched back to the active beam 106a or to other non-active beams 106b. In order to estimate channel quality for K base stations, there is a trade-off between additional processing power and additional dwell time. Additional processing capability may be provided (i.e., add hardware and/or microprocessor/DSP capability or the like) or additional dwell time may be provided to switch the current beam to non-active beams 106b for additional periods in which channel quality measurements can be made. At one extreme, additional processing capability could be added such that the channel quality of all base stations could be estimated in a single dwell time. At the other extreme, additional dwell times could be added with no additional processing capability of the WTRU 102. The dwell time may be added consecutively or may be spread out over the single measurement period.

Figure 5:
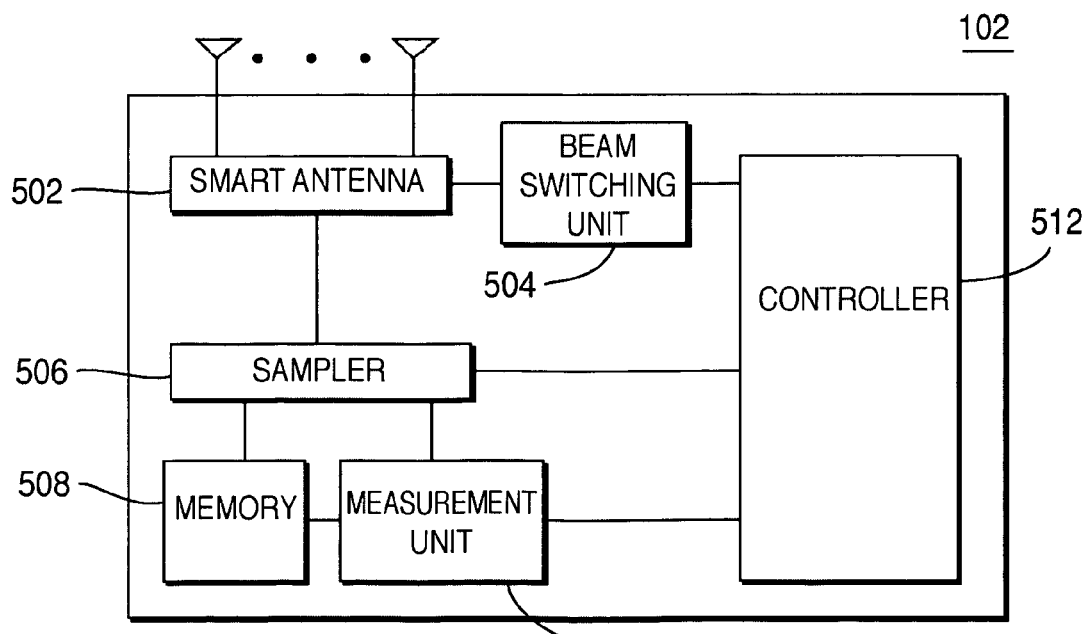
FIG. 5 is a block diagram of a WTRU in accordance with the present invention.

FIG. 5 is a block diagram of a WTRU 102 in accordance with the present invention. The WTRU 102 comprises a smart antenna 502, a beam switching unit 504, a sampler 506, a memory 508, a measurement unit 510, and a controller 512. The smart antenna 502 is configured to generate a plurality of directional beams, and, optionally, an omni-directional beam. Each beam is used to receive signals transmitted by base stations. The beam switching unit 504 is for switching the current beam to one of the plurality of directional beams and between one of the directional beams and the omni-directional beam (if an omni-directional beam exists). The sampler 506 receives the signals from the smart antenna 502 which is directed toward a particular direction and generates samples of the received signals. The samples are stored in the memory 508. The measurement unit 510 performs a physical measurement (also called an estimation) of a channel quality using the samples. The controller 512 controls the beam switching unit 504 such that the current beam is switched to a non-active beam at the start of a dwell time and switches back to the active beam for communication with a serving base station at the expiration of the dwell time or multiple dwell times, as needed. The dwell time is minimized by performing the physical measurements while the samples are being collected and stored and while the current beam is switched back to the active beam or another non-active beam.

Using terminology from FDD and CDMA2000, the base stations that the WTRU has to measure SIR estimates for include the base stations in the candidate set and/or the base stations in the neighbor set and/or the base stations in the active set.

The method of the invention is not limited to a two-dimensional beam switching, but also applicable to three-dimensional beam switching.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for measuring channel quality in a wireless transmit/receive unit (WTRU), the WTRU being equipped with a smart antenna for generating a plurality of beams, selected from the group consisting of directional beams and an omni-directional beam, the method comprising the steps of:
   (a) providing a dwell time in a measurement period to switch a beam from an active beam to a non-active beam, the active beam being a beam for communication with a serving base station;
   (b) switching a beam to a non-active beam at the initiation of the dwell time;
   (c) receiving signals from the serving base station and a non-serving base station through the switched non-active beam at the same time;
   (d) generating samples of the received signals;
   (e) storing the samples in a memory;
   (f) measuring a channel quality to the serving base station and a channel quality to the non-serving base station, respectively, using the stored samples; and
   (g) switching the beam back to the active beam.

2. The method of claim 1, wherein the WTRU simultaneously measures at least one of the channel quality to the serving base station and the channel quality to the non-serving base station during the dwell time while generating the samples.

3. The method of claim 1, further comprising the step of determining whether resources in the WTRU are sufficient to measure a channel quality for all the serving and non-serving base stations in a current measurement period, wherein the beam is switched back to the active beam if the resources are sufficient, and additional dwell time is provided to perform further measurements before switching the beam to the active beam if the resources are not sufficient.

4. The method of claim 3, wherein the additional dwell time is provided not consecutively to the current dwell time.

5. The method of claim 3, wherein the additional dwell time is provided consecutively to the current dwell time.

6. The method of claim 1, wherein the WTRU is configured to generate more than two beams, whereby steps (a)-(f) are repeated for all the remaining non-active beams, respectively.

7. The method of claim 6, wherein the beam is switched from the non-active beam to the active beam before switching to another non-active beam.

8. The method of claim 7, wherein a gap is provided before the beam is switched to another non-active beam.

9. The method of claim 6, wherein the beam is directly switched from the non-active beam to another non-active beam before switching back to the active beam.

10. The method of claim 9, further comprising the step of determining whether resources in the WTRU are sufficient to measure a channel quality for all the serving and non-serving base stations in a current measurement period, wherein the beam is switched to a different non-active beam if the resources are sufficient, and additional dwell time is provided to perform further measurements if the resources are not sufficient.

11. The method of claim 1, wherein the channel quality is measured by a signal-to-interference ratio (SIR).

12. The method of claim 11, wherein the SIR is measured using known code sequences with which correlation can be performed.

13. The method of claim 1, wherein the measurement period is provided periodically.

14. The method of claim 1, wherein the measurement period is not provided periodically.

15. A wireless transmit/receive unit (WTRU), comprising:
   a smart antenna configured to generate a plurality of beams, selected from the group consisting of directional beams and an omni-directional beam, an active beam being a beam for communication with a serving base station;
   a beam switching unit for switching beams;
   a sampler for generating samples of received signals received from the serving base station and a non-serving base station at the same time via one of the beams;
   a memory for storing the samples;
   a measurement unit for performing measurements of a channel quality to the serving base station and channel quality to the non-serving base station, respectively, using the stored samples; and
   a controller for switching a beam from an active beam to a non-active beam during a dwell time which is provided at least once in a measurement period and switching the beam back to the active beam, wherein the WTRU performs physical measurements of channel quality to the serving base station and channel quality to the non-serving base station using the stored samples such that the dwell time to measure the channel quality is minimized.

16. The WTRU of claim 15, wherein the measurement unit measures at least one of the channel quality to the serving base station and the channel quality to the non-serving base station using the samples when the beam is switched to the non-active beam.

17. The WTRU of claim 15, wherein the controller determines whether resources in the WTRU are sufficient to measure a channel quality for all the serving and non-serving base stations, wherein the controller switches the beam to the active beam if the resources are sufficient, and the controller provides additional dwell time to perform further measurements before switching back to the active beam if the resources are not sufficient.

18. The WTRU of claim 17, wherein the additional dwell time is provided not consecutive to the current dwell time.

19. The WTRU of claim 17, wherein the additional dwell time is provided consecutively to the current dwell time.

20. The WTRU of claim 15, wherein the smart antenna is configured to generate more than two beams and the controller performs a measurement of channel quality using at least one non-active beam.

21. The WTRU of claim 20, wherein the beam is switched from the non-active beam to the active beam before switching to another non-active beam.

22. The WTRU of claim 21, wherein a gap is provided before the beam is switched to another non-active beam.

23. The WTRU of claim 20, wherein the beam is directly switched from the non-active beam to another non-active beam before switching back to the active beam.

24. The WTRU of claim 23, wherein the controller determines whether resources in the WTRU are sufficient to measure a channel quality for all the serving and non-serving base stations, wherein the controller switches the beam to a different non-active beam if the resources are sufficient, and the controller provides additional dwell time to perform further measurements if the resources are not sufficient.

25. The WTRU of claim 15, wherein the channel quality is measured by a signal-to-interference ratio (SIR).

26. The WTRU of claim 25, wherein the SIR is measured using known code sequences with which correlation can be performed.

27. The WTRU of claim 15, wherein the measurement period is provided periodically.

28. The WTRU of claim 15, wherein the measurement period is not provided periodically.

* * * * *